(12) United States Patent
Roth

(10) Patent No.: US 8,275,494 B1
(45) Date of Patent: Sep. 25, 2012

(54) SYSTEM, APPARATUS AND METHOD FOR CONTROLLING AN AIRCRAFT

(76) Inventor: Michael Roth, Staten Island, NY (US)

( * ) Notice: Subject to any disclaimer, the term of this patent is extended or adjusted under 35 U.S.C. 154(b) by 402 days.

(21) Appl. No.: 12/650,644

(22) Filed: Dec. 31, 2009

(51) Int. Cl.
*B64C 19/00* (2006.01)
(52) U.S. Cl. ............... 701/3; 701/36; 244/75.1; 307/9.1
(58) Field of Classification Search ................ 701/3, 1, 701/36; 244/75.1, 1 R; 307/9.1
See application file for complete search history.

(56) References Cited

U.S. PATENT DOCUMENTS

| | | | |
|---|---|---|---|
| 4,422,180 A | 12/1983 | Wendt | |
| 4,626,996 A | 12/1986 | Arlott | |
| 5,469,150 A | 11/1995 | Sitte | |
| 5,761,625 A | 6/1998 | Honcik et al. | |
| 5,778,203 A | 7/1998 | Birkedahl et al. | |
| 5,857,205 A | 1/1999 | Roth | |
| 6,561,454 B1 | 5/2003 | White, III | |
| 6,664,656 B2 | 12/2003 | Bernier | |
| 6,801,769 B1 | 10/2004 | Royalty | |
| 6,865,460 B2 | 3/2005 | Bray et al. | |
| 6,906,618 B2 | 6/2005 | Hair, III et al. | |
| 6,934,612 B2 | 8/2005 | Remboski et al. | |
| 7,015,798 B2 | 3/2006 | Hair, III et al. | |
| 7,231,180 B2 | 6/2007 | Benson et al. | |
| 7,261,028 B2 | 8/2007 | Devries et al. | |
| 7,272,496 B2 | 9/2007 | Remboski et al. | |
| 7,359,592 B2 | 4/2008 | Truong | |
| 7,550,866 B2 * | 6/2009 | Breit et al. ..................... 307/9.1 |
| 7,724,778 B2 * | 5/2010 | Ying ........................... 370/489 |
| 7,868,621 B2 * | 1/2011 | Liu et al. ...................... 324/512 |
| 2004/0076428 A1 * | 4/2004 | Green et al. ..................... 398/9 |
| 2005/0065669 A1 * | 3/2005 | Roux et al. ........................ 701/3 |
| 2005/0105527 A1 | 5/2005 | Vervust et al. | |
| 2006/0004505 A1 * | 1/2006 | Christiansen et al. .......... 701/49 |
| 2008/0234838 A1 | 9/2008 | Ghanekar et al. | |
| 2008/0303353 A1 | 12/2008 | Yu et al. | |
| 2009/0138872 A1 | 5/2009 | Fuchs et al. | |
| 2010/0156171 A1 * | 6/2010 | Sechrist ........................ 307/9.1 |
| 2010/0204854 A1 * | 8/2010 | Chang et al. ................... 701/14 |

* cited by examiner

*Primary Examiner* — Ruth Ilan
*Assistant Examiner* — Keith Frisby
(74) *Attorney, Agent, or Firm* — Cooper & Dunham LLP

(57) ABSTRACT

Apparatuses, systems and methods are provided for controlling an aircraft.

19 Claims, 12 Drawing Sheets

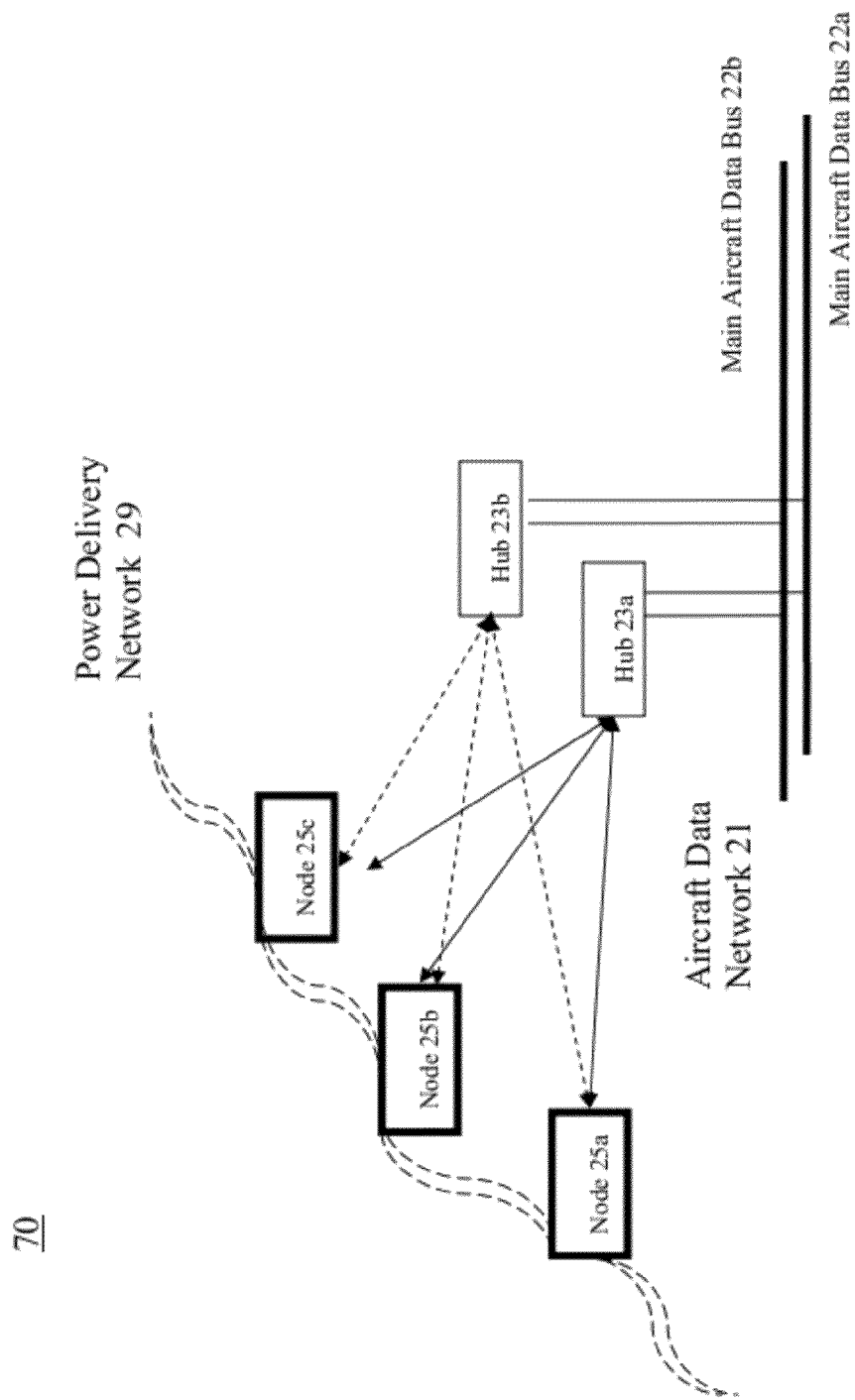

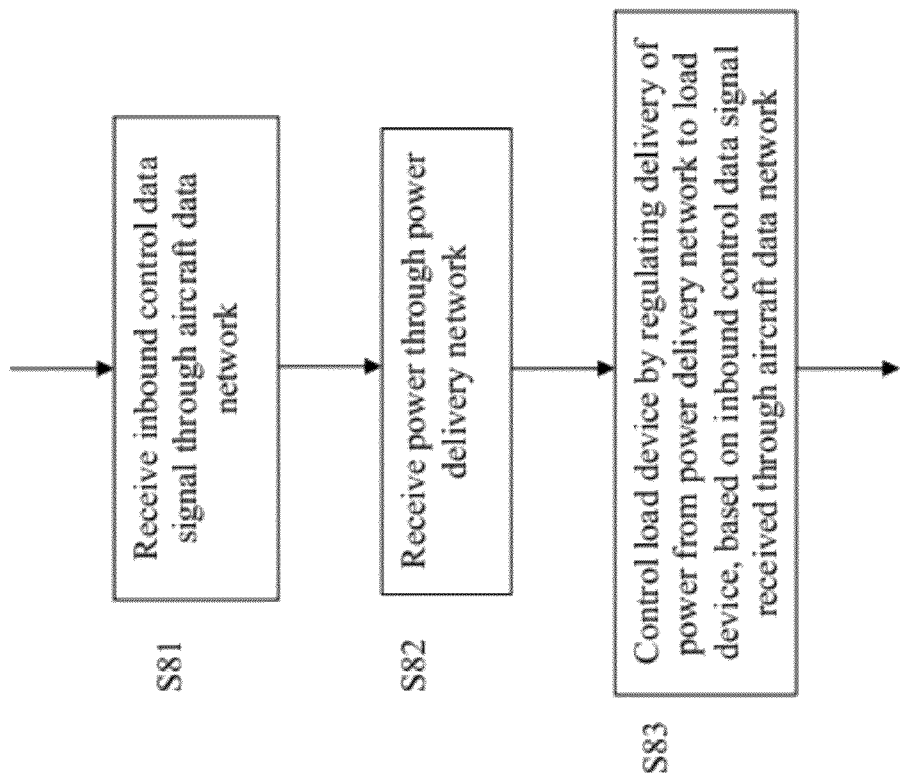

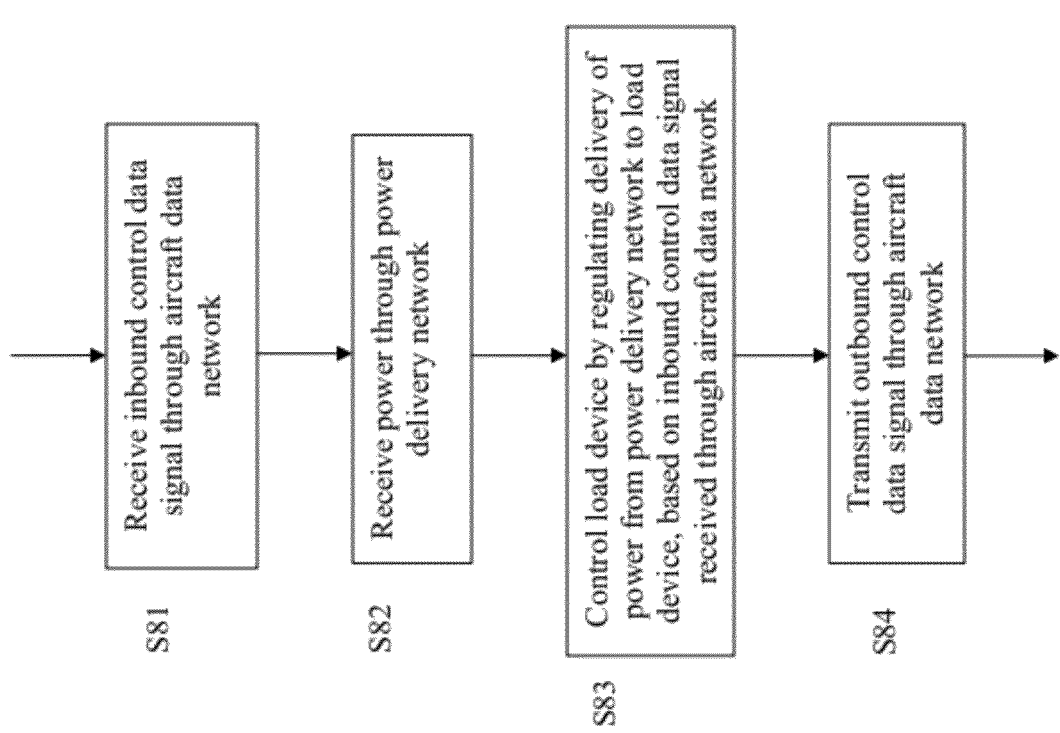

SYSTEM, APPARATUS AND METHOD FOR CONTROLLING AN AIRCRAFT

TECHNICAL FIELD

This disclosure relates to systems, apparatuses and methodologies for controlling an aircraft.

BACKGROUND

Modern aircraft include many electrical and mechanical devices which are controlled from remote locations within the aircraft. According to current aircraft design practice, aircraft control systems employ dedicated point-to-point electrical wiring connections between system controllers and each of the various load devices they control.

FIG. 1A depicts a conventionally-wired system 100 of the prior art. Separate one-way single purpose wires are run from a system controller 12 in the nose of the plane to each of a plurality of remotely accessed load devices 10a through 10g. The system controller 12 transmits control signals to the load devices via these one-way point-to-point wiring connections.

However, as these aircraft systems grow, both in size and complexity, there is the drawback that the traditional method of direct point-to-point wiring has become excessively complex, unwieldy and expensive, as a considerable amount of wiring is required in order to connect the various elements. For example, the Airbus A380, the largest of the new airliners, carries approximately 300 miles of electrical wiring. This translates to substantial additional weight and increased fuel costs.

The large number of point-to-point wiring connections in close proximity to each other has also resulted in problems due to excessive heat generation, and wire signals interfering and crossing with each other. Indeed, some incidents (including a few air crashes) have directly resulted from electrical wiring problems within an aircraft. These problems with the conventional point-to-point connections are only exacerbated as the number of load devices in modern aircraft increases.

Moreover, conventional aircraft wiring systems are further complicated because of the distinction often made between traditional load devices, which are only presumed to receive control signals from system controllers, and sensor devices, which are only presumed to transmit signals back to the system controllers. Based on this distinction, sensor devices in an aircraft are often provided with their own one-way point-to-point wiring connections to the system controllers, separate and distinct from the wiring connections between the traditional load devices and the system controllers. Thus, the total amount of point-to-point wiring in the aircraft is increased.

For example, FIG. 1B depicts a conventionally-wired system 101 which is similar to system 100 in FIG. 1A, except that sensor devices 10x through 10z transmit signals back to the system controller 12. These sensor devices use one-way point-to-point wiring connections to return information back to the system controller.

This aspect of current wiring systems has the further drawback that it is often not feasible to transmit data to a sensor device or receive data from a traditional load device, or to transmit data directly between sensor and/or load devices.

U.S. Pat. No. 6,664,656 proposes an aircraft electrical power distribution network wherein one-way point-to-point wiring is provided between the loads and remote power distribution units (which are connected to system controllers), and similar one-way point-to-point wiring is provided between sensors and remote data concentrators (which are also connected to the system controllers).

In such a system, the amount of wiring is still relatively high, due to the use of the point-to-point wiring connections that cannot be shared between loads and/or sensors.

Further, the one-way nature of the wiring prevents the ability of the loads themselves to transmit data back to the remote power distribution units, as well as the ability of the sensors themselves to receive data from the remote data concentrators, and the ability of any load/sensor device to transmit data directly to another load/sensor device.

There exists a need for an improved approach for efficiently and directly controlling a plurality of devices in an aircraft, with a simpler control system that uses less wiring than conventional methods.

SUMMARY

This disclosure provides tools (in the form of systems, apparatuses and methodologies) for controlling an aircraft, and more specifically of controlling an aircraft by controlling the delivery of power to device network nodes.

In an aspect of this disclosure, there is provided a control system comprising: an aircraft data network; a power delivery network separate from the aircraft data network configured to deliver power from a power source within the aircraft; and a plurality of device network nodes, each of the plurality of device network nodes being connected to both the aircraft data network and the power delivery network and being configured to conduct two-way communication with other ones of the plurality of device network nodes, comprising at least one load device provided in the aircraft and configured to transmit an outbound control data signal via the aircraft data network to control a second load device corresponding to a second device network node, and a device power control unit configured to control the delivery of power from the power delivery network to said load device, based on an inbound control data signal received by the device network node from said second load device via the aircraft data network.

In another aspect of this disclosure, an aircraft communications system communicates with a remote station outside an aircraft, wherein the aircraft communications system receives remote control signals from a remote station and transmits the remote control signals through an aircraft data network to a first device network node, wherein the first device network node controls the delivery of power from the power delivery network to a first load device corresponding to the first device network node, based on said remote control data signals received through the aircraft data network.

In another aspect of this disclosure, an aircraft communications system communicates with a remote station outside an aircraft, wherein the aircraft communications system records control data and other data communicated between device network nodes and transmits this data to the remote station, where it can be stored and analyzed either in real time or at a later time in order to monitor and analyze events on the aircraft.

BRIEF DESCRIPTION OF THE DRAWINGS

The above-mentioned and other features, aspects and advantages can be more readily understood from the following detailed description with reference to the accompanying drawings wherein:

FIG. 7 shows a schematic of an aircraft control system with redundant features, according to the exemplary embodiment of this disclosure;

FIGS. 8A and 8B show a flow chart illustrating an example of a workflow of a device network node, according to another exemplary embodiment of this disclosure;

DETAILED DESCRIPTION

Figure 1A:
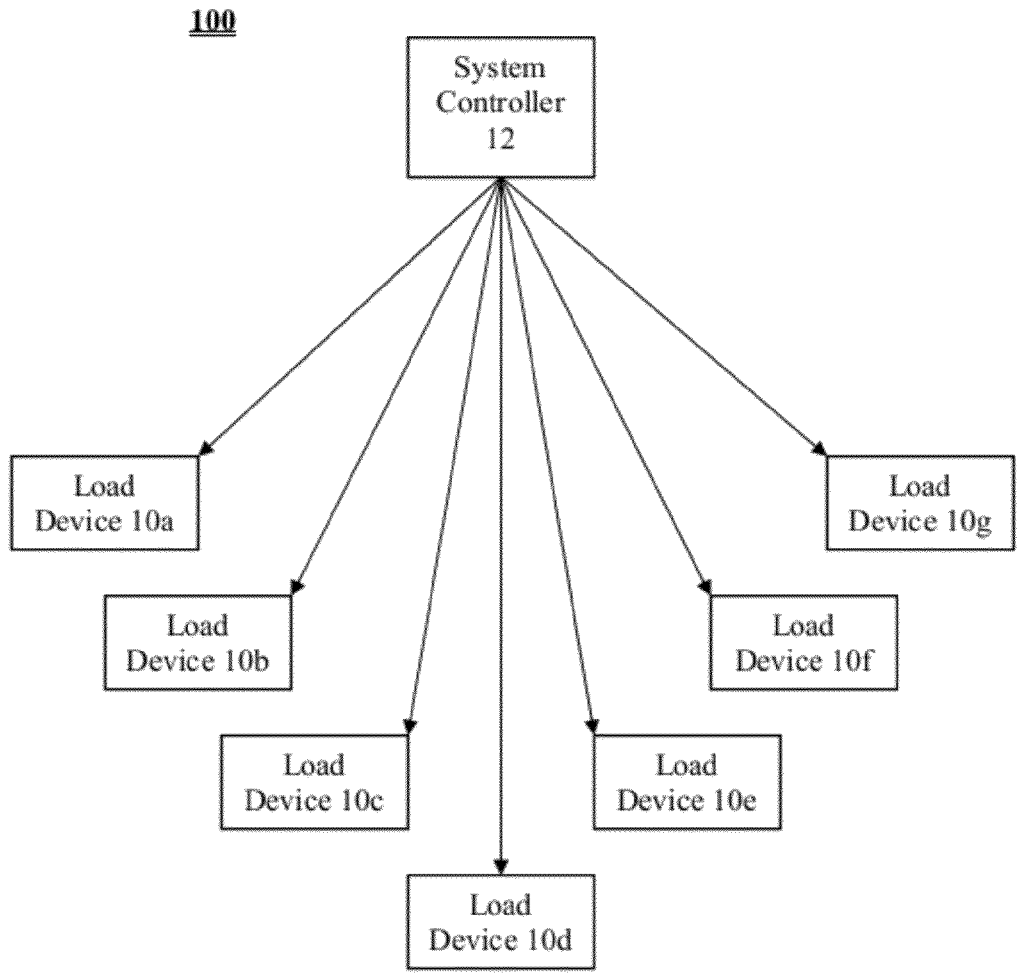
FIGS. 1A and 1B show the conventional aircraft control system of the prior art.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Figure 2A:
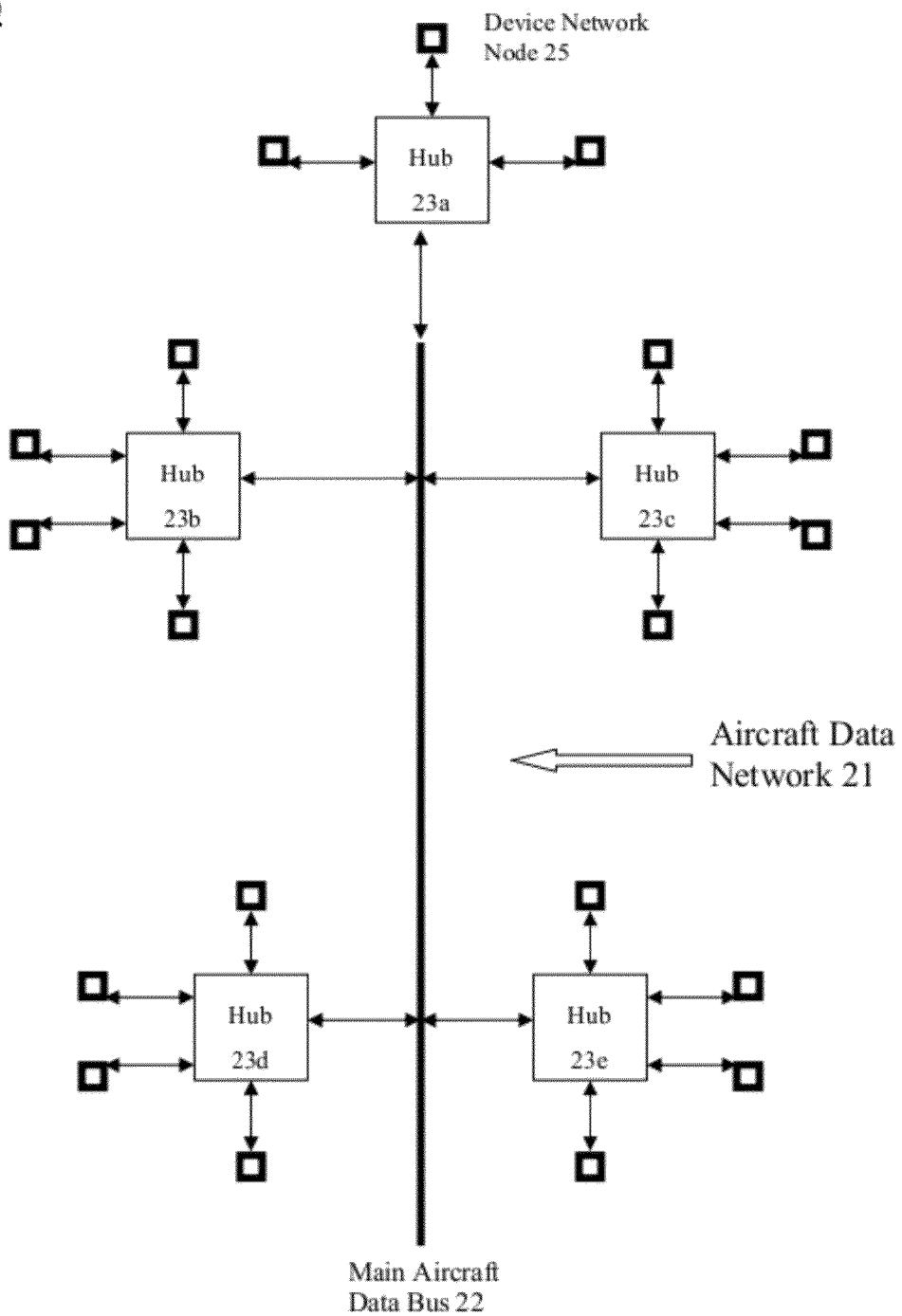
FIGS. 2-3 shows a schematic of the aircraft control system of the present application, according to an exemplary embodiment of this disclosure.
Figure 2B:
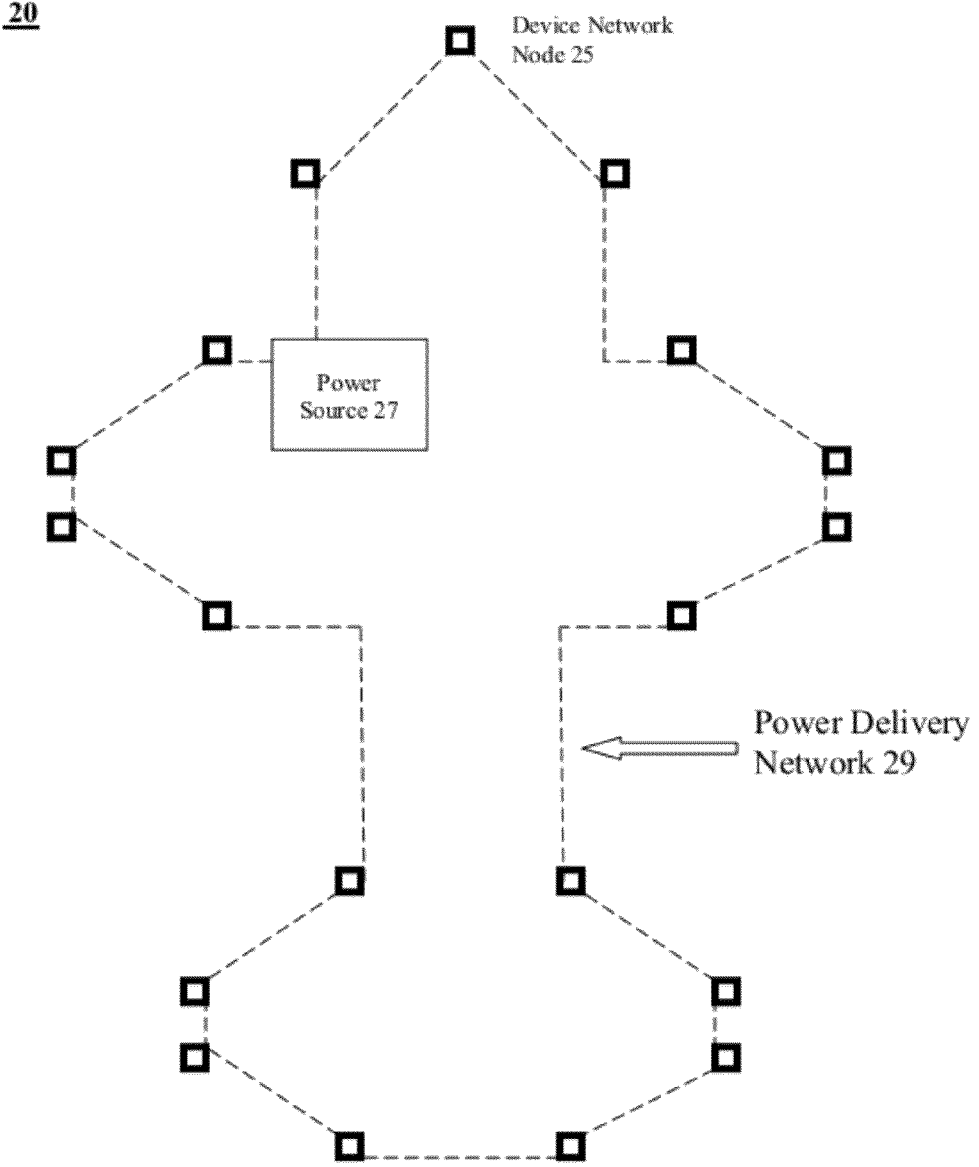
Figure 3:
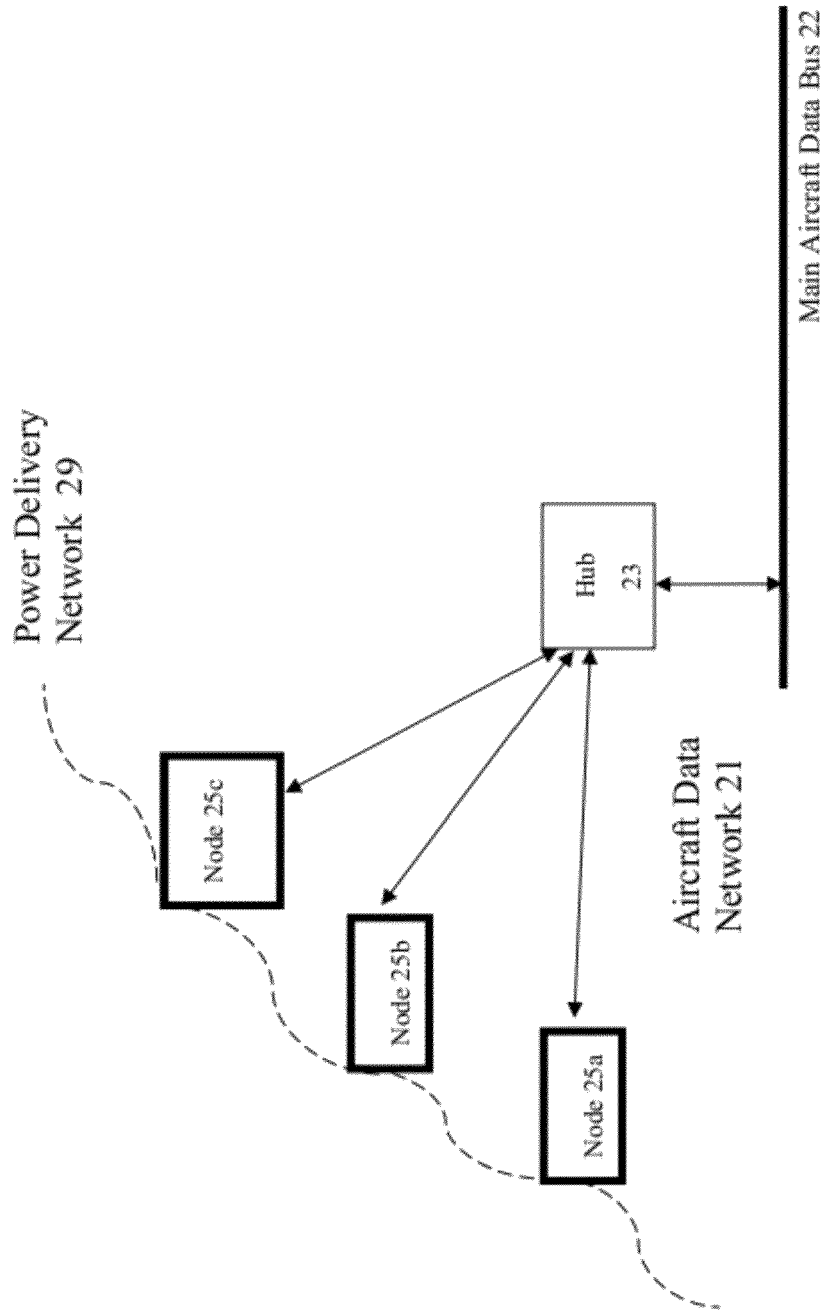

Referring now to the drawings, wherein like reference numerals designate identical or corresponding parts throughout the several views, FIGS. 2 and 3 show schematically an aircraft control system 20 according to an exemplary embodiment of this disclosure.

Figure 1B:
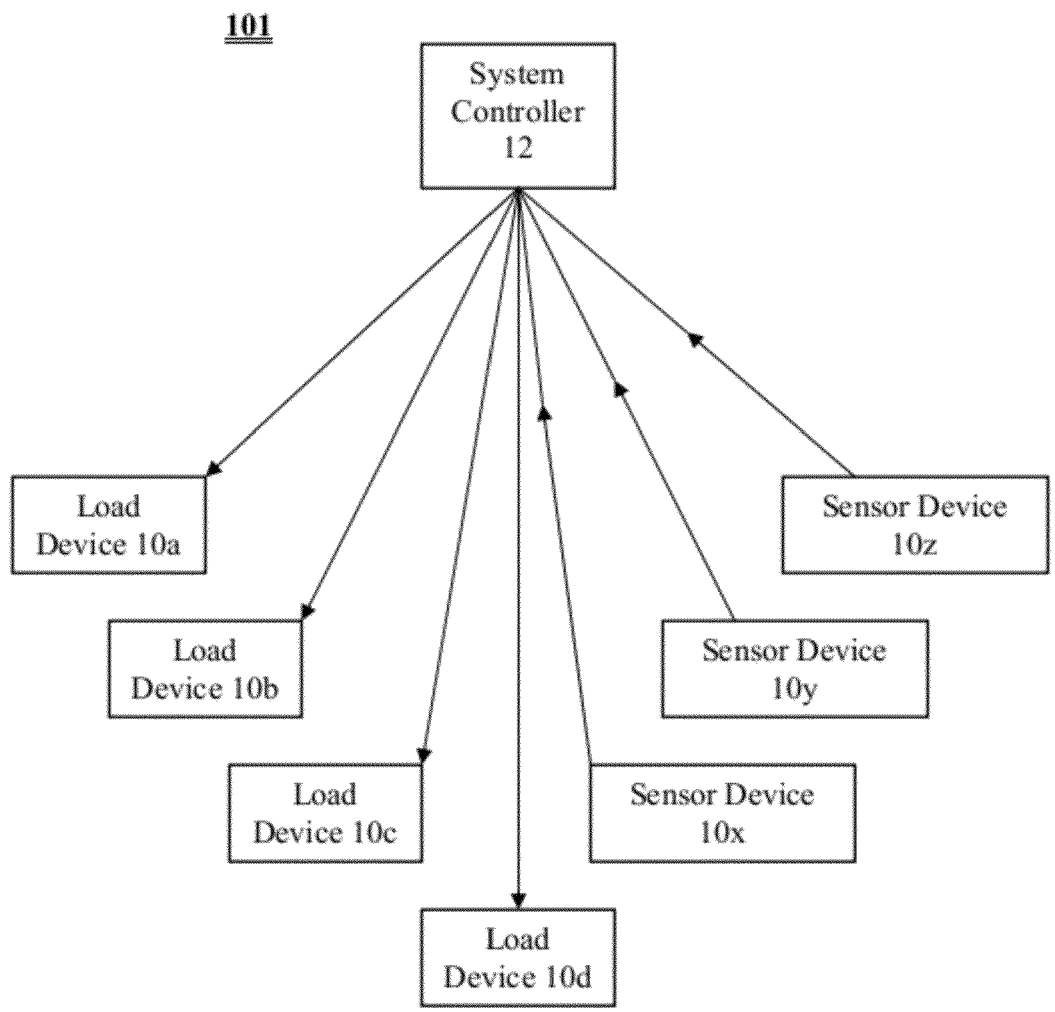

Aircraft control system 20 includes a plurality of device network nodes 25 provided in the aircraft. Each device network node comprises a load device (similar to load and sensor devices 10 depicted in FIG. 1) as will be discussed later. The aircraft control system 20 also includes an aircraft data network 21 connecting the plurality of aircraft network nodes as depicted in FIG. 2A, allowing for the two-way communication of data signals between any two or more of the device network nodes 25. The aircraft control system 20 further includes a power delivery network 29 (separate from the aircraft data network 21) connected to the plurality of device network nodes 25, as depicted in FIG. 2B, for delivering power to the plurality of device network nodes.

In accordance with the present embodiment of this disclosure, each device network node 25 controls the load device 10 corresponding to that respective device network node, based on inbound control data signals transmitted to the device network node 25 through the aircraft data network 21. The inbound control data signals will typically originate from a second device network node connected to the aircraft data network, where the second device network node contains a second load device that can generate instructions for the load device 10.

In particular, each device network node 25 controls the corresponding load device by regulating the delivery of the source of power that activates the load device, from the power delivery network 29, based on the inbound control data signals received by the device network node 25 from the aircraft data network 21.

According to this disclosure, the load device of each network node 25 may generally be any device in the aircraft that requires power to operate, is controlled remotely, receives data from another location and/or transmits data to another location, and each load device in the aircraft generally corresponds to a different device network node 25. Load devices include but are not limited to flight control surfaces (ailerons, flaps, rudders, air brakes, etc. . . . ), aircraft engine components, aircraft undercarriage components, lights, and so forth. According to this disclosure, load devices may also be any kind of sensor within an aircraft, such as devices used to measure position, attitude, airspeed, pressure, force, temperature, surrounding conditions and so forth. Load devices may include control input devices such as control wheels/joysticks, rudder pedals, throttles, and other display and control units within the aircraft that allow the flight crew to operate the aircraft. Load devices may further include computer processors and system controllers—which are often federated and contained with dedicated boxes or line replaceable units (LRUs) located in E/E bays, where such system controllers contain the necessary processing and input/output electronics to perform aircraft control functions based on instructions from the crew. Load devices may even include devices within the passenger and crew cabins that are available for use by the passengers and crew, including internal lights, climate control equipment, food preparation equipment, personal entertainment systems, and so forth.

Thus, a key aspect of the aircraft control system 20 is that all load devices on the aircraft are connected as device network nodes to an aircraft data network in an aircraft, behaving functionally as nodes in a data network. In this way, a sensor device, a control input device or any other load device is regarded as just another node in a network, where information may be transmitted to the node or received from the node.

The aircraft data network 21 depicted in FIG. 2A connects the plurality of aircraft network nodes 25, thereby allowing two-way communication of data signals between any two or more of said aircraft network nodes 25. The aircraft data network 21 includes at least one main aircraft data bus 22 that runs through a major part of the aircraft fuselage, and a plurality of network hubs 23 connected to the main aircraft data bus 22. A plurality of device network nodes 25 are connected to each network hub 23, and are thereby connected to the main aircraft data bus 22 and the aircraft data network 21 generally.

The network hubs 23 are similar to the hub devices well known in the computer networking field, and serve as network connection points for connecting a plurality of network nodes to a data network. Each device network node 25 of the present application will generally be connected to the closest network hub 23 in order to minimize wiring, as depicted in FIG. 2A.

The wiring for the data network may include any wiring connection that allows for the two-way communication of data signals between network devices, including metal wiring, coaxial cable, twisted pair wiring and fiber-optic cable. Note that in some situations, the data network is preferably not constituted by a wireless communication system, which may not be appropriate for the mission-critical transmission of primary aircraft control data signals.

In the present embodiment, the aircraft data network 21 is configured in a 'tree' topology, which is a combination of a 'bus' topology connection, between the main aircraft data bus 22 and the network hubs 23, and a 'star' topology connection, between the device network nodes 25 and network hubs 23. This tree topology is the most dominant topology used in many networking applications, including most Ethernet-type networks. The tree topology minimizes the wiring to a great extent, since much of the data connection wiring between the device network nodes is shared (along the main aircraft data bus 22, for example). However, the present application is not specifically limited to a 'tree' topology, and a choice of other topologies for these connections are available to provide the optimum mix of connection speed (for data), wire length and ease of installation and troubleshooting.

It should be appreciated that communication of data signals may be conducted simultaneously between multiple device network nodes over the aircraft data network 21. For example, a first load device of a first device network node may simultaneously transmit outbound control data signals to a plurality of other device network nodes, thereby simultaneously controlling the plurality of device network nodes.

The power delivery network 29 depicted in FIG. 2B is separate from the aircraft data network 21, and is configured to deliver power from a power source 27 within the aircraft to the plurality of aircraft network nodes 25. The power delivery network may connect the device network nodes to the power source in a closed loop or 'ring' configuration in order to save weight, as depicted in FIG. 2B, such that each device network node is directly connected by the power delivery network to two adjacent device network nodes. While the term delivery has been used, it should be understood that the power from the power delivery network may be used to fully drive the load devices in the aircraft.

The power source (27) may be any of many on-board aircraft power sources well known in the art, including a propulsion plant, an auxiliary turbine power unit, a slip wind turbine, a battery, and so forth (although it will of course be appreciated that the sources may supply power with different voltages, frequencies, etc).

Thus, according to this exemplary embodiment of the present invention, there is provided the tools for efficiently controlling load devices in an aircraft, wherein each load device corresponds to a device network node in the aircraft.

The aircraft control system of this embodiment separates the delivery of power to network nodes from the delivery of control information to the network nodes, where the control information directs how that power is to be provided to load devices at the network nodes. In other words, all load devices in the aircraft system can be connected as network nodes by an aircraft data network and, separately, by a power delivery network. The application of the available power from the power delivery network is controlled by commands sent over the aircraft data network.

By separating the functions of supplying power and control, and by implementing a true control data network to replace the conventional prior art system of point-to-point connections, the aircraft control system of the present application features a large reduction in the total amount of wiring. The savings in wire come from the ability of the device network nodes to share much of the power line connections and data line connections with other device network nodes, when compared to the conventional point-to-point connection schemes of the prior art where each connection only serves one pair of nodes. Indeed, since modern and future airliners may have many thousands of such nodes, the economical benefits of wiring according to the present embodiment will only increase as the number of load devices increases.

FIG. 3 depicts a portion of the aircraft control system 20 according to the present embodiment, and clearly shows how a plurality of device network nodes 25a through 25c are simultaneously connected to the aircraft data network 21 and to the separate power delivery network 29. In particular, the plurality of device network nodes 25a through 25c are connected to network hub 23 and main aircraft data bus 22 of the aircraft data network 21 in a "tree" topology, as described above. The plurality of device network nodes 25a through 25c are also connected via lines to the power delivery network 29 in a loop configuration. Preferably, the plurality of device network nodes 25a through 25c are connected to the power delivery network 29 via parallel lines for increased redundancy, although only single lines are shown in FIG. 3, in the interests of clarity.

Figure 4:
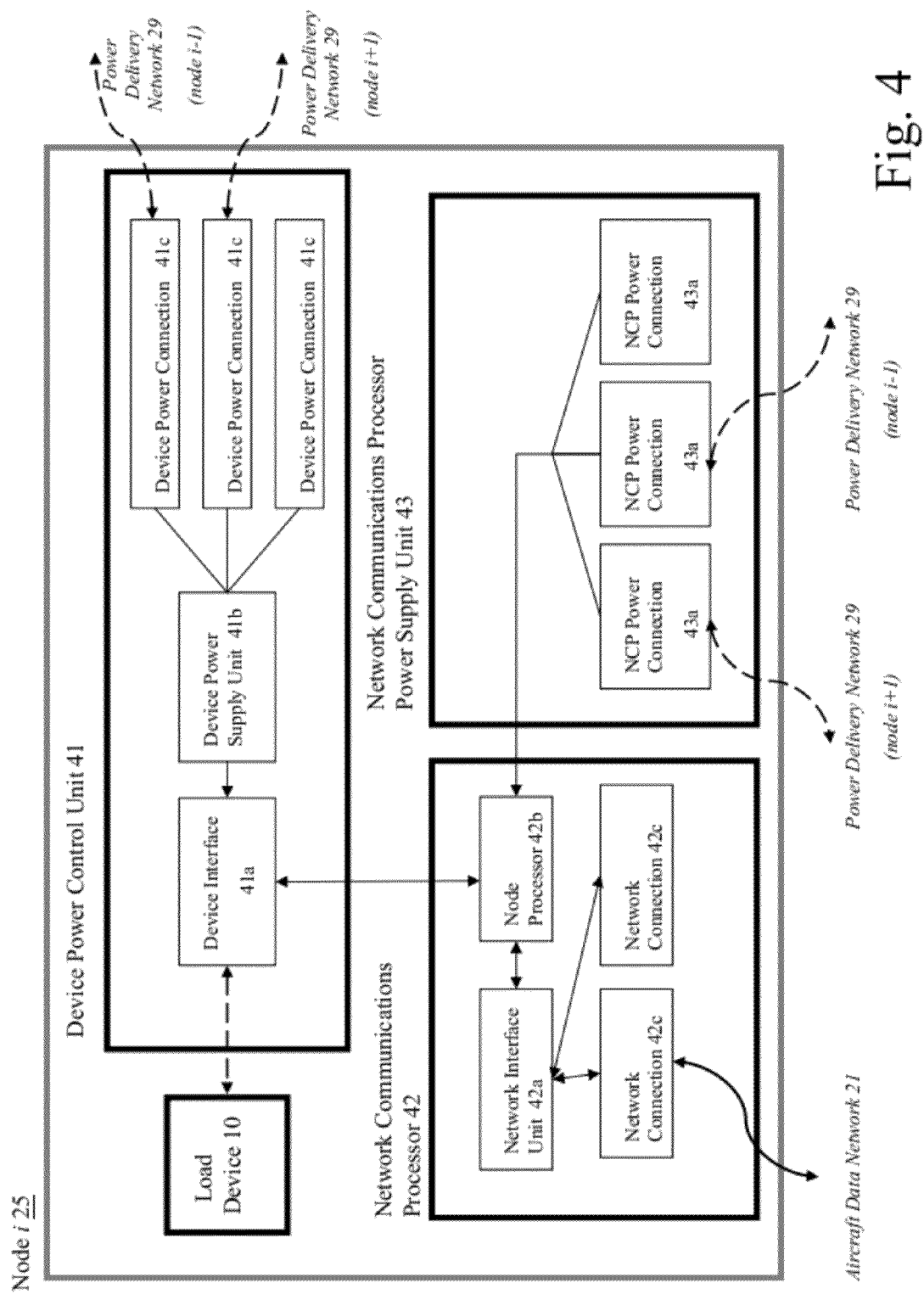
FIG. 4 shows a block diagram of an exemplary configuration of a device network node.

FIG. 4 shows in detail a block diagram of an exemplary configuration of a generic device network node i 25. Device network node 25 comprises a load device 10, a device power control unit 41 for receiving power from the power delivery network 29 and providing power to the load device 10, a network communications processor 42 for communicating with the aircraft data network 21, and an optional network communications processor power supply unit 43 for receiving power from the power delivery network 29 and providing power to the network communications processor 42.

According to the present embodiment, the device power control unit 41 controls the delivery of power to the load device 10, based on control data signals received by the network communications processor 42 from the aircraft data network 21. Such received control data signals are referred to as inbound control data signals in this disclosure.

Load device 10, as discussed earlier, may be any device in the aircraft that requires electrical power to operate, is controlled remotely and/or sends information to another location.

The device power control unit 41 is designed to directly interface with the load device 10 and supply power to the load device 10. The device power control unit 41 includes device power connections 41c connected to the power delivery network 29. The device power control unit 41 also includes a device power supply unit 41b for receiving power for powering the load device 10 from the power delivery network 29, via the device power connections 41c.

The device power control unit 41 further includes a device interface 41a for interfacing with the load device 10 and for controlling the delivery of power from the device power supply unit 41b to the load device 10, based on inbound control data signals received from the network communications processor 42. These control data signals may be transmitted from a second load device corresponding to a second device network node. For instance, the device interface 41a may permit the delivery of power from the device power supply unit 41b to the load device 10, when an inbound control data signal indicates that the load device is to be provided with power. Alternatively, the device interface 41a may prevent the delivery of power from the device power supply unit 41b to the load device 10, when an inbound control data signal indicates that the load device is not to be provided with power. Thus, power from the power delivery network 21 does not reach the load device 10 without passing through the power control unit 41 of the device network node 25.

While the control data signals have been described as indicating that a load device is to be provided with power or that a load device is not to be provided with power, the device interface 41a may receive other forms of control data signals that may be transmitted to the load device in order to effect the proper operation of the load device (for example, a control data signal instructing a servo-actuator load device to move a certain extent in one direction or another).

The network communications processor 42 comprises a network interface unit 42a, a node processor 42b, and network connections 42c connected to the aircraft data network 21.

The node processor 42b communicates with the aircraft data network 21 via the network interface unit 42a, which is connected to the network connections 42c. The node processor 42b also communicates with the device interface 41a of the device power control unit 41, and relays data signals received from the aircraft data network 21 to the device interface 41a. Specifically, the node processor 42b may transmit inbound control data signals received from the aircraft data network 21 to the device interface 41a. The device interface 41a controls the delivery of power from the device power supply unit 41b to the load device 10, based on such inbound control data signals received from the node processor 42b, as described above. These inbound control data signals may be transmitted from a second load device corresponding to a second device network node.

The network interface unit 42a may be a network interface card well know in the computer networking field, and may be similar in configuration to the Ethernet network interface cards (NICs) found in many personal computing devices. The network interface unit, like Ethernet NICs found in most computers, may contain a unique ID/identifier, which will be associated with the load device 10 at this device network node 25i. In this manner, each device network node 25 in the aircraft data network 21 will be uniquely self-identifying, as is the case in most modern peer-to-peer information networks. The data network may employ any data network protocol including Ethernet, Token Ring, or any of the existing aviation data networking standards such as the Avionics Full-Duplex Switched Ethernet (AFDX) network standard, the Aeronautical Radio, Incorporated (ARINC) ethernet network standard, or another network standard.

Each data network node may be associated with the load device or sensor device at that node by having each device power control unit 41 embody a hard-wired device ID for each unique load device 10. This function might also be accomplished in software by means of a lookup table associating the network interface processor 42a with the load device 10.

The network communications processor 42 and its various constituent components are powered by the network communications processor power supply unit 43. The network communications processor power supply unit 43 includes network communications processor power connections 43a, which are connected to the power delivery network 29 and receive power that is provided to the node processor 42b and the other components of the network communications processor 42 as required.

Where the network communication processor 42 is self-powered, the network communications processor power supply unit 43 may be omitted from the design.

Furthermore, the device interface 41a of the device power control unit 41 is also configured to receive data signals from the load device 10 for transmission to the node processor 42b and ultimately to the aircraft data network 21, amplifying and/or interpreting these signals as necessary. In particular, the device interface 41a may be configured to receive a control data signal from the load device 10 for transmission to the aircraft data network 21, where this control data signal may be transmitted to a second load device corresponding to a second device network node and may be used to control the second load device in the manner described above. Such control data signals transmitted from the load device to the aircraft data network via the components of the device network node are referred to as outbound control data signals in this disclosure.

Moreover, the load device 10 may be a passive sensor device that transmits sensor data signals to the aircraft data network 21, for use by other device network nodes (corresponding to system controllers and display output devices, for example). Alternatively, the load device 10 may be configured to transmit feedback data signals with information about the status of the load device to the aircraft data network. Such feedback data signals may indicate the position and conditions affecting the load device (which may be a control surface such as a rudder, for example), and may be used by a feedback controller system to describe or simulate the status of the load device (through a "force feedback" control input device, for example) as is well known in the art.

It will be seen in FIG. 4 that for the device power connections 41c and the NCP power connections 43a, two connections to the power delivery network 29 are provided—one from node i−1 and one to node i+1—in order to facilitate the proposed loop or ring wiring topology in this embodiment. (The node in FIG. 1 is arbitrarily numbered as node "i", where "i" represents any integer. Neighboring adjacent nodes are therefore referred to here as nodes "i−1" and "i+1". Note that the notion of a connection to another node being either "from" or "to" is arbitrary, and the words "from" and "to" are interchangeable in this context).

It will also be seen in FIG. 4 that a third connection point exists for the device power connections 41c and the NCP power connections 43a. This third connection point represent the possibility for redundant/backup connections to the power delivery network 29, and there may be any arbitrary number of further redundant/backup connections to the power delivery network 29 as necessary. Similarly, a further network connection to the aircraft data network 21 may be provided, as represented by the second network connection 42c in FIG. 4.

The device interface 41a and node processor 42b may be realized in computer processor devices possessing the requisite functionality described in this disclosure. The components of the device power control unit 41, network communication processor 42 and network communications processor power supply unit 43 generally may be incorporated onto one or more integrated chips or circuit boards, and may be contained within an integrated housing that is operatively coupled to the load device 10.

It is preferable that the components of the network communications processor 42 and the network communications processor power supply unit 43 be standardized across each of the device network node 25. The exact configuration and capacity of the power supply unit 41b will depend on the power requirements of the load device 10. Note that not all load devices may require power, and in the case of certain passive sensors for example, power from the power delivery network 29 may not be required to activate the device.

Figure 5:
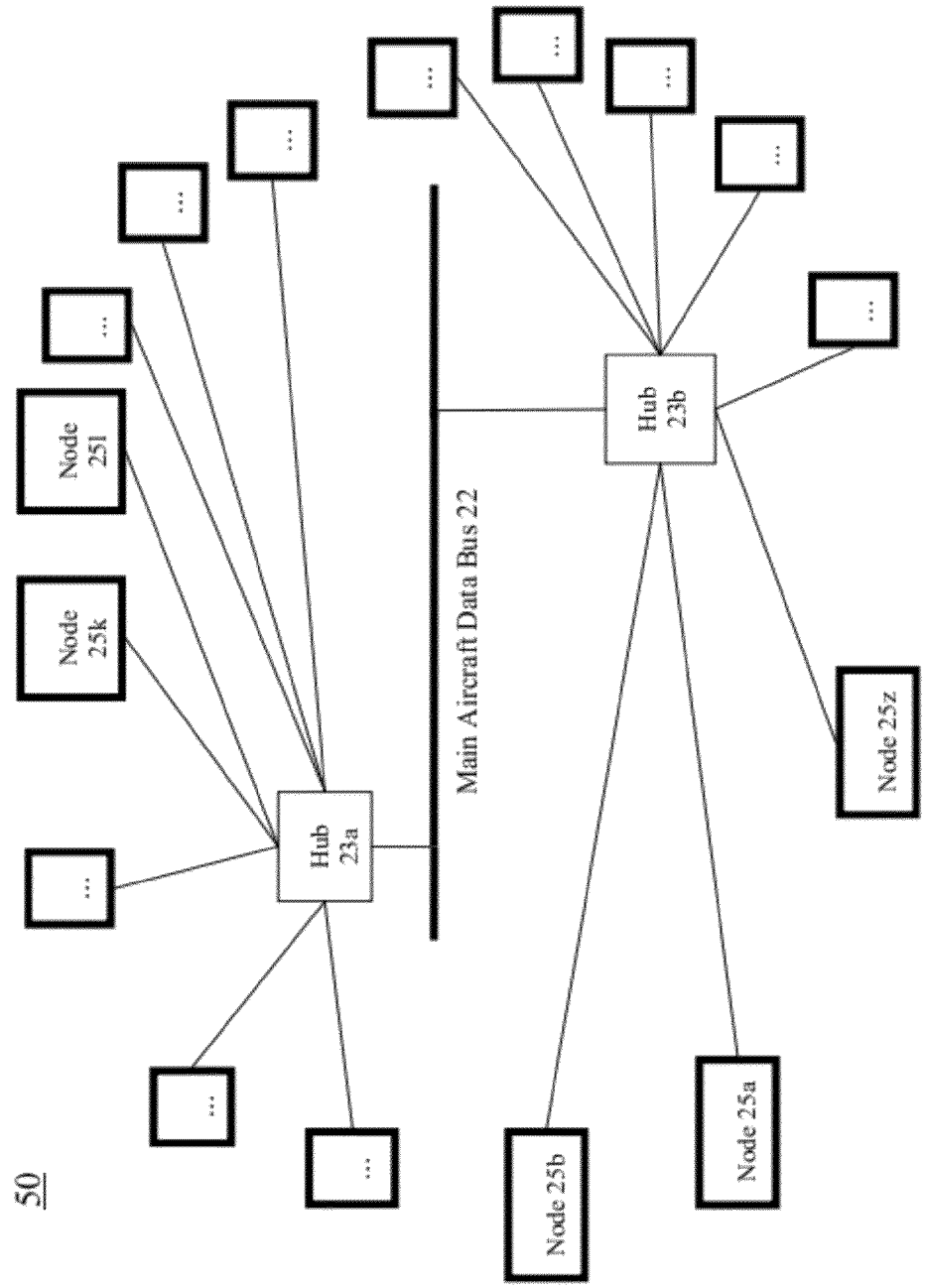
FIG. 5 shows a schematic of an aircraft data network.
Figure 6:
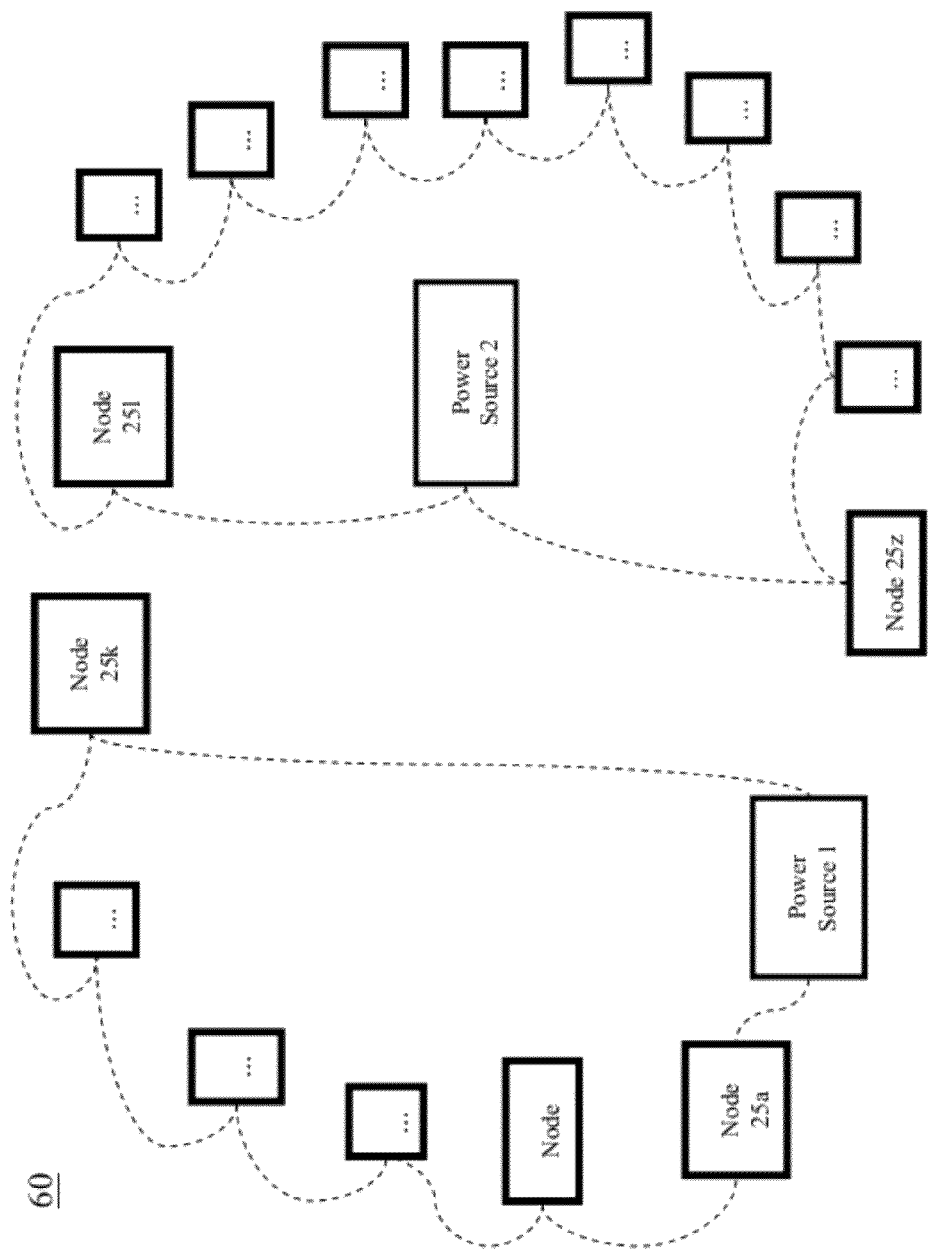
FIG. 6 shows a schematic of a power delivery network.

Turning now to FIGS. 5 and 6, illustrations depicting the aircraft data network 20 for controlling load devices with different power requirement according to the present embodiment are presented.

FIG. 5 depicts a configuration 50 in which device network nodes 25a through 25z may be connected according to the aircraft data network 21 of the present embodiment. A first plurality of the device network nodes are connected to the main aircraft data bus 22 via network hub 23a, while a second plurality of the device network nodes are connected to the main aircraft data bus 22 via network hub 23b. Since the aircraft data network 21 is configured for the transmission of data signals and not for the delivery of power, the manner in which the device network nodes are connected to the aircraft data network 21 is not dependent on the power requirements of the corresponding load devices. Therefore, device network nodes having load devices with different power requirements may be connected to the same network hub 23.

FIG. 6 depicts a configuration 60 in which the same device network nodes as in FIG. 5 are connected to the power delivery network 29. The power delivery network 29 may consist of multiple power loops or rings that may be required in order to meet different power requirements.

It will be seen that a plurality of device network nodes 25a ... 25k having loads with a first power requirement are connected in a power loop with power source 1, while a plurality of device network nodes 25l ... 25z having loads with a second power requirement are connected in a power loop with power source 2. Thus, while the power requirements of the system may vary from load device to load device, a plurality of load devices with similar or identical power requirements may be connected together as device nodes in a single shared power loop.

FIG. 7 depicts a portion 70 of the aircraft control network 20 similar that shown in FIGS. 3 and 5-6, except with enhanced redundant aspects. Since the aircraft control system 20 is provided for controlling an aircraft and its various critical systems, the entire system may be made failsafe by duplicating all or part of the power and control data connections, in order to ensure the safe operation of the aircraft.

Referring to FIG. 7, all the connections and elements of the aircraft data network 21 may be duplicated in order to provide a redundant failsafe backup. Each device network node 25a through 25c is separately connected to separate network hubs 23a and 23b. In turn, each network hub 23a and 23b is separately connected to separate aircraft data buses 22a and 22b. Similarly, the power connection lines of power delivery network 29 between device network nodes 25a-25c may also be duplicated to ensure the failsafe delivery of power. Further redundancy is possible, such as providing all necessary components in quadruplicate, as is common in vital aircraft systems. Since the aircraft control system of this disclosure already results in a substantial reduction in wiring, the impact of increased wiring to provide redundant connections is minimal.

In FIG. 8A, a flow chart illustrating a workflow of a device network node corresponding to a load device in an aircraft is presented.

In step S81 a device network node receives an inbound control data signal through an aircraft data network, said aircraft data network connecting a plurality of device network nodes in the aircraft. In a preferred embodiment, the inbound control data signal originates from a second load device corresponding to a second device network node connected to the aircraft data network. In step S82, the device network node receives power through a power delivery network separate from the aircraft data network, said power delivery network connecting the plurality of device network nodes and configured to deliver power from a power source within the aircraft to the plurality of device network nodes. In step S83, the device network node controls the load device by regulating the delivery of power received from the power delivery network to the load device, based on the inbound control data signal received by the device network node through the aircraft data network in step S91.

In FIG. 8B, a flowchart illustrating a more detailed example of a workflow of a device network node is presented.

Steps S81 through S83 are substantially similar to those of FIG. 8A.

In step S84, the device network node transmits an outbound control data signal (originating from the load device) to a second device network node corresponding to a second load device, via the aircraft data network. This outbound control data signal is received by the second device network node, and the second device network node controls the delivery of power from the power delivery to the second load device, based on the outbound control data signal received by the second device network node.

Figure 9:
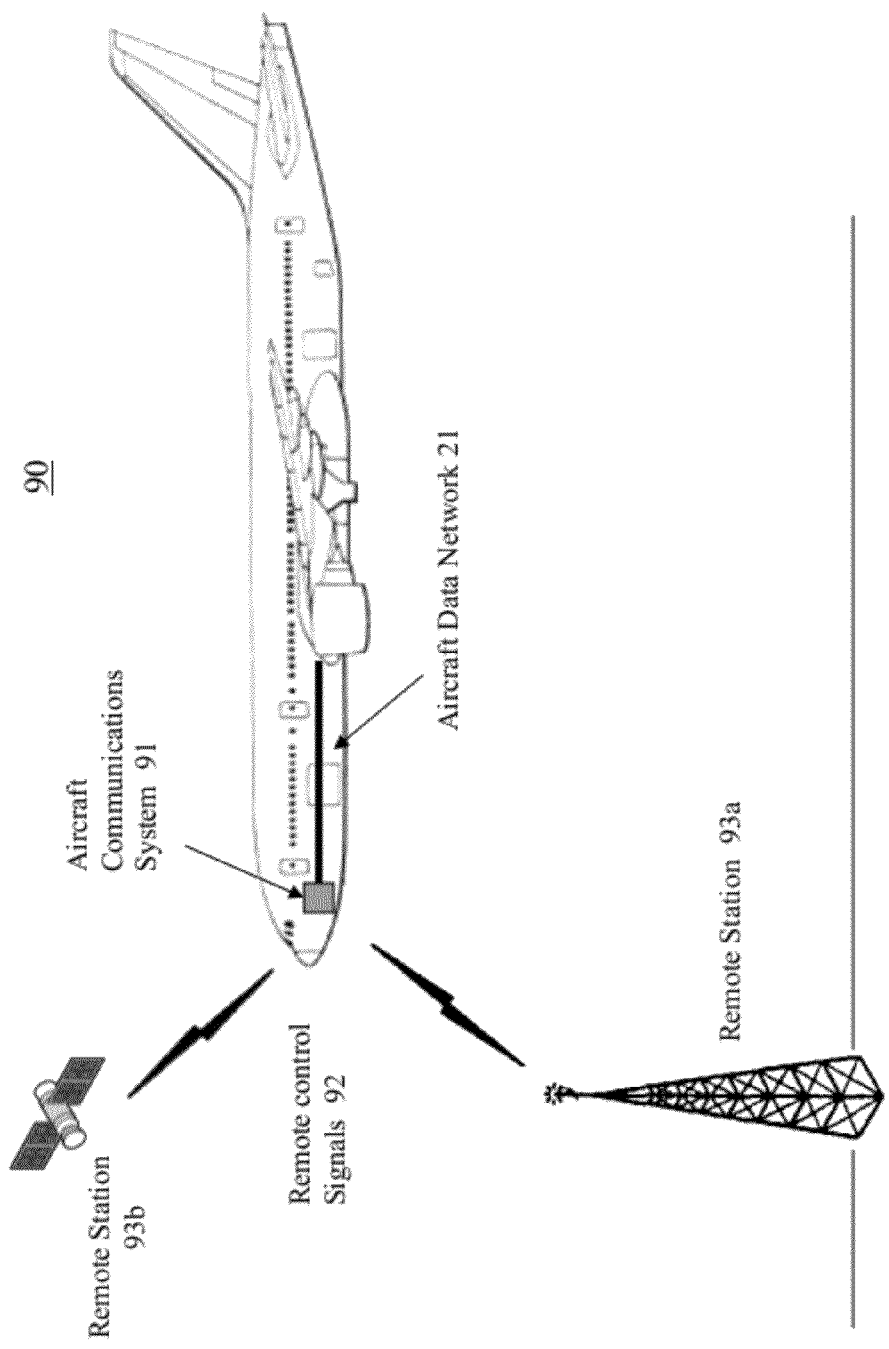
FIG. 9 shows a schematic of a remote control system according to another exemplary embodiment of this disclosure.

Turning now to FIG. 9, a schematic of a remote monitoring and control system 90 for remotely controlling load devices in an aircraft according to another exemplary embodiment of this disclosure is presented. The remote control system 90 is similar to the aircraft control system 20 discussed earlier, except that remote control system 90 further includes an aircraft communication system 91 for recording network data and communicating with a remote station 93a (a ground station) or a remote station 93b (an airborne or satellite station) outside the aircraft. The aircraft communications system 91 is configured to receive remote control signals 92 from the remote station 93a or the remote station 93b, and to transmit the remote control signals to the aircraft data network 21. Thereafter, a first device network node (not shown) connected to the aircraft data network 21 may control the delivery of power from a power delivery network to a first load device corresponding to the first device network node, as described by the teachings in this disclosure, based on remote control data signals 92 received through the aircraft data network 21. The aircraft communication system 91 may be configured as just another device network node connected to the aircraft data network and power delivery network.

The remote control system according to this exemplary embodiment thus allows for the remote control of all load devices in an aircraft, by communicating remote control data signals to device network nodes of an aircraft data network from a remote location. Such a system may be useful for the control of manned and unmanned aircraft.

The remote control system according to this exemplary embodiment also allows for the recording of control data and other data communicated between device network nodes and allows for the transmission of this data to a remote station, where it can be stored and analyzed either in real time or at a later time in order to monitor and analyze events on the aircraft. Moreover, since every function of the aircraft may be transmitted over the data network and recorded for future reference, it may be possible to "play back" any part of an aircraft's flight or ground activity (in conjunction with a flight simulator, for example).

Thus, according to the present disclosure there is provided the tools, systems and methods for an improved approach for efficiently and directly controlling a plurality of load devices in an aircraft, with a simpler control system that uses less wiring than conventional methods.

As stated above, all load devices in the aircraft control system 20 are connected as device network nodes to an aircraft data network, and behave functionally as nodes in a data network. Thus, a sensor device, a control input device or any other load device is regarded as just another node in a network, where information may be transmitted to the node or received from the node.

Hence, this disclosure provides great advantages over the prior art, since aircraft devices that were traditionally only able to either receive signals or transmit signals via point-to-point wiring, may now be configured to both receive and transmit data to other aircraft devices over an aircraft data network.

For example, the aircraft control system of this disclosure provides the ability to transmit data to a sensor device and selectively control the application of power to a sensor device. This allows for the ability to turn sensors on and off in the interests of troubleshooting, maintenance, and repair, as well as the ability to transmit diagnostic test signals to the sensors, control the application of heat to external probe sensors and pitot tubes, and so forth.

Further, this disclosure provides the ability for a traditional load device such as an aircraft control surface, servo-mechanism or aircraft engine component to transmit data back to a network. Such data may be a status signal of the device or a force feedback signal.

Moreover, this disclosure provides the ability for any device connected to the network to transmit and receive data from any other device connected to the network, providing the groundwork for a so-called "smart network." In particular, control data signals may be directly transmitted between any two aircraft load devices. Thus, there is the advantage that if a smart sensor, for example, detects an abnormal condition with respect to a specific electrical servo mechanism or aircraft engine component, the sensor can directly transmit a control data signal to the device network node corresponding to that mechanism or component, thereby instructing that mechanism or component to perform a certain action. Similarly, if a smart sensor detects an emergency condition with respect to an aircraft's speed or attitude, the smart sensor can directly transmit control data signals to load devices in the aircraft, thereby instructing those load devices to perform the necessary functions to help resolve the emergency situation.

While elements of this disclosure have referred to a control system for aircraft, it should be apparent that the advantages of the present invention are equally applicable to other systems involving control of load devices, such as marine vessels, spacecraft, subways and other rail systems, smart transit systems, factories, etc.

The above-mentioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An aircraft control system for controlling an aircraft comprising:
    an aircraft data network;
    a power delivery network separate from the aircraft data network configured to deliver power from a power source within the aircraft; and
    a plurality of device network nodes, each of the plurality of device network nodes (i) being connected to both the aircraft data network and the power delivery network, (ii) being configured to conduct two-way communication with other ones of the plurality of device network nodes, and (iii) comprising
        a first load device provided in the aircraft and configured to transmit an outbound control data signal via the aircraft data network to control a second load device of a second device network node, and
        a device power control unit configured to control the delivery of power from the power delivery network to said first load device, based on an inbound control data signal received by the device network node from said second load device via the aircraft data network.

2. The aircraft control system of claim 1, wherein the aircraft data network allows two-way communication of control data signals between any two or more of said plurality of device network nodes.

3. The aircraft control system of claim 1, wherein said outbound control data signal transmitted by the first load device is received by the second device network node, and
    wherein the second device network node controls the delivery of power from the power delivery network to said second load device, based on the outbound control data signal received by the second device network node.

4. The aircraft control system of claim 1, wherein the aircraft data network comprises
    at least one main aircraft data bus; and
    a plurality of data network hubs connected to the main aircraft data bus, each data network huh serving as an interconnection point for a plurality of device network nodes,
    wherein a first plurality of device network nodes are directly connected to a first data network huh located in close proximity to said first plurality of device network nodes.

5. The aircraft control system of claim 4, wherein the device power control unit of the device network node is operatively coupled to the first load device.

6. The aircraft control system of claim 1, wherein each of the device network nodes further comprises:
    a network communications processor for communicating with the aircraft data network;
    wherein said device power control unit receives power from the power delivery network and controls the delivery of power to said first load device, based on said inbound control data signal received by the network communication processor from said aircraft data network.

7. The aircraft control system of claim 6, wherein the device power control unit comprises:
    a device power connection connected to said power delivery network;
    a device power supply unit for receiving power from the power delivery network via the device power connection; and
    a device interface for interfacing with said first load device, said device interface regulating the delivery of power from said device power supply unit to said first load device based on said inbound control data signal received from the network communications processor.

8. The aircraft control system of claim 7, wherein the network communications processor comprises a node processor for communicating with the aircraft data network via a network interlace unit, and for communicating with said device interface of the device power control unit.

9. The aircraft control system of claim 6, wherein when the node processor receives said inbound control data signal from the aircraft data network via the network interface unit, the node processor transmits the inbound control data signal to the device interface of the device power control unit and,
    wherein the device interface of the device power control unit permits the delivery of power from the device power supply unit to the first load device, when the inbound control data signal indicates that the first load device is to be provided with power; and
    wherein the device interface of the device power control unit prevents the delivery of power from the device power supply unit to the first load device, when the inbound control data signal indicates that the first load device is not to be provided with power.

10. The aircraft control system of claim 6, wherein each of the device network nodes further comprises a network communications processor power supply unit for receiving power from said power delivery network and providing power to said network communications processor.

11. The aircraft control system of claim 1, wherein a feedback controller system operates to provide information regarding the status of said first load device, based on feedback data signals transmitted to the aircraft data network from a device network node corresponding to the first load device.

12. The aircraft control system of claim 1, wherein said first load device is a sensor device, and a device network node corresponding to said sensor device transmits sensor data signals from said sensor device to said aircraft data network.

13. The aircraft control system of claim 1, wherein every load device provided in the aircraft corresponds to a device network node.

14. The aircraft control system of claim 1, wherein said power delivery network connects the device network nodes to the power source in a loop configuration, such that each device network node is directly connected by the power delivery network to two adjacent device network nodes.

15. The aircraft control system of claim 1, wherein any load device corresponding to any of the plurality of device network nodes can transmit and receive control data signals from any other load device corresponding to any other of the plurality of device network nodes.

16. The aircraft control system of claim 1, wherein the aircraft data network allows two-way communication of control data signals between any two or more of the plurality of device network nodes.

17. A remote control system for remotely controlling load devices in an aircraft comprising:
an aircraft data network;
a power delivery network separate from the aircraft data network configured to deliver power from a power source within the aircraft;
a plurality of device network nodes, each of the plurality of device network nodes (i) being connected to both the aircraft data network and the power delivery network, (ii) being configured to conduct two-way communication with other ones of the plurality of device network nodes, and (iii) comprising
a first load device provided in the aircraft and configured to transmit an outbound control data signal via the aircraft data network to control a second load device of a second device network node, and
a device power control unit configured to control the delivery of power from the power delivery network to said first load device, based on an inbound control data signal received by the device network node from said second load device via the aircraft data network; and
an aircraft communications system for communicating with a remote station outside said aircraft,
wherein the aircraft communications system receives remote control signals from said remote station and transmits said remote control signals through said aircraft data network to a first device network node, and
wherein the first device network node controls the delivery of power from the power delivery network to said first load device corresponding to the first device network node, based on said remote control data signals received through the aircraft data network.

18. The remote control system of claim 17, wherein the aircraft communications system records data transmitted through the aircraft data network between device network nodes, and transmits thh recorded data to the remote station.

19. A method for controlling a first load device in an aircraft by a first device network node in the aircraft comprising the steps of:
receiving by the first device network node an inbound control data signal through an aircraft data network, said aircraft data network connecting a plurality of device network nodes in the aircraft;
receiving by the first device network node power from a power delivery network separate from the aircraft data network, said power delivery network connecting the plurality of device network nodes and configured to deliver power source within the aircraft to the plurality of device network nodes; and
controlling said first load device by regulating the delivery of power received from the power delivery network to said first load device, based on said inbound control data signal received by the first device network node through the aircraft data network,
wherein the inbound control data signal received by the first device network node is transmitted from a second load device of a second device network node connected to the aircraft data network, and
wherein the first load device transmits an outbound control data signal via the aircraft data network to the second load device of the second device network node, to thereby control the second load device.

* * * * *